W. H. WINFIELD & W. SENN.
CAN OPENER.
APPLICATION FILED DEC. 31, 1907.

901,510.

Patented Oct. 20, 1908.

WITNESSES:

INVENTORS

BY

ATTORNEYS

THE NORRIS PETERS CO., WASHINGTON, D. C.

UNITED STATES PATENT OFFICE.

WILLIAM H. WINFIELD, OF RICHMOND HILL, AND WILLIAM SENN, OF NEW YORK, N. Y.

CAN-OPENER.

No. 901,510.   Specification of Letters Patent.   Patented Oct. 20, 1908.

Application filed December 31, 1907. Serial No. 408,780.

*To all whom it may concern:*

Be it known that we, WILLIAM HENRY WINFIELD, a citizen of the United States of America, and a resident of Richmond Hill, county of Queens, State of New York, and WILLIAM SENN, a citizen of the United States of America, and a resident of New York, county and State of New York, have invented certain new and useful Improvements in Can-Openers, of which the following is a specification, reference being had to the accompanying drawings, forming a part thereof.

Our invention relates to improvements in can openers and comprises a gripping device for engaging and holding a can to be opened and a cutter carrying lever so connected to the gripping device as to be capable of movements toward and away therefrom and also a movement through a circular path parallel with the top of a can when held by the said gripping device.

Our invention also consists in certain novel details of construction as will hereinafter more fully appear, and in order that our invention may be fully understood, we will describe in detail an embodiment thereof having reference to the accompanying drawings in which the same is illustrated.

Figure 1:
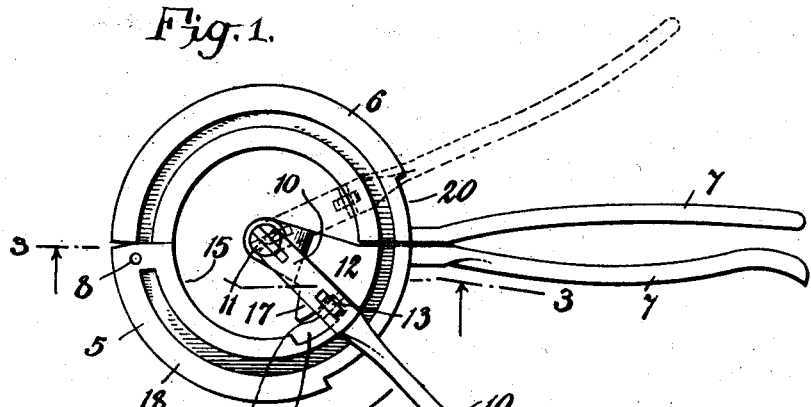
Figure 2:
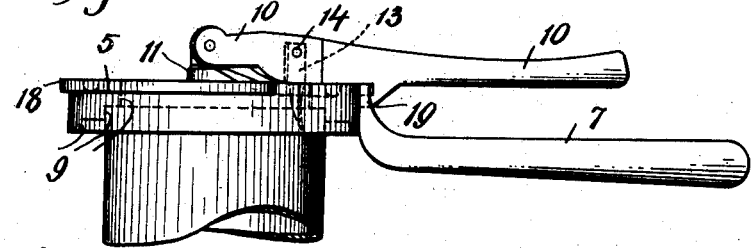
Figure 3:
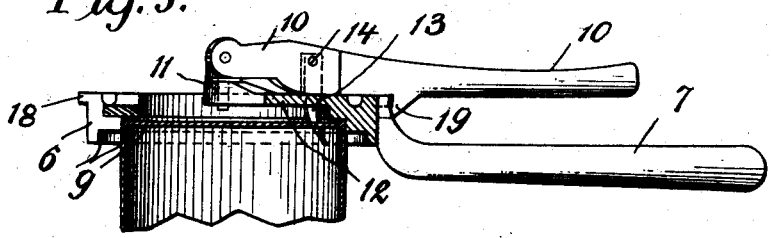
Figure 4:
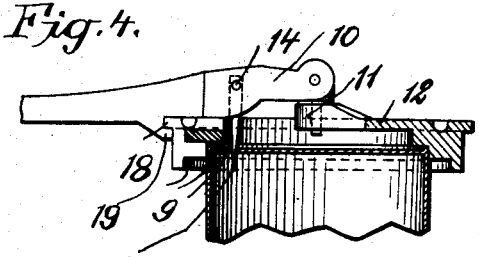

In the drawings: Figure 1 is a top view of the device. Fig. 2 is a view in side elevation thereof, showing the device in operative position upon a can. Fig. 3 is a view in central vertical section therethrough, the plane of section being upon line 3—3 of Fig. 1. Fig. 4 is a similar sectional view, but with the cutter carrying lever in a different position.

The gripping device comprises two members, 5, 6, each provided with a handle 7. The parts 5, 6, are pivoted together by means of a pivot pin 8 preferably at a point opposite the handles 7, such pivotal connection permitting limited movements of the portions 5, 6, with respect to each other. The members 5, 6, have each a plurality of engaging faces 9 at various points from the center thereof, the said faces forming preferably segments of concentric rings. The rings represented by the said segments are preferably substantially the size of the diameter of standard cans such as condensed milk cans, vegetable or fruit cans, so that the said device may be applied to the head of such cans by being slightly opened about the pivotal connection 8 and then caused to grip the top of such can by means of pressure applied to draw the two handles 7, 7, together. The two handles 7, 7, are of such a form as to be readily grasped by one hand so that the other hand will be left entirely free to manipulate the cutter carrying lever.

The cutter carrying lever 10 is pivoted upon a central post 11, the said central post being itself pivoted in a lug 12 carried by one of the said gripping members, the said pivotal connection being concentric with the gripping faces 9 and at right angles to the pivotal connection between the lever and the post. By this means, the lever 10 is permitted to have a circular movement in a plane parallel with the top of the can when it is held in place by the gripping means and also a movement toward and away from the said top of the can.

The lever 10 carries a cutter 13 which is preferably pivoted thereto by means of pivot pin 14. This cutter projects downwardly from the said lever as clearly appears in Figs. 2, 3 and 4 of the drawings, to a point past the gripping faces 9, the said members 5 and 6 being provided with an open space 15 for thus receiving the said cutter and preferably with a receiving opening 16 which extends for a distance somewhat further from the axial center of the lever than does the opening 15. A guard portion 17 is also preferably provided which constitutes one wall of the opening 16 and forms a guide or guard for the cutter as it is inserted into place. As a guide or guard for the lever in its circular movement, the members 5 and 6 are provided with a flanged portion 18, and the lever 10 has on the under side thereof, an underhanging lip 19 for engaging it. The flange 18 is cut away as at 20 at points near the handles 7 so as to provide a part at the commencement of one of the said members, 5, 6, and at the end of the other said member, where the lever may be freely moved up and down with respect to the gripping device.

In operation, the can is first engaged and held by the gripping means while the lever is lifted up so that the cutter will be clear of the top of the can. The said lever 10 is then pressed downward while substantially at the point in which it is shown in Fig. 1 wherein the cutter is opposite the opening 16 and the lug 19 is opposite the cut away portion 20 of the flange 18 of the member 5. There will be sufficient leverage to readily force the cutter through the top of the can, the said cutter being pointed at the end for this purpose. After the lever has been thus forced down as far as it will go, it is then moved in a circular path in direction of the arrow in Fig. 1. After the first movement of the lever, the lug 19 will be caused to engage the flange 18 so that during the rest of the movement, the lever will be mechanically prevented from lifting. When the lever has been moved around to the position in which it is shown in dotted lines in Fig. 1, the cut will be completed and the lever will then be free to be lifted, the lug 19 having at this time arrived at the point of the cut away portion 20 of the flange 18 of the member 6. If it is desired to complete the cut all the way around the can, the can may be momentarily released by the gripping means, then given a partial turn and the can again gripped, the lever 10 being moved rearwardly when the can is thus partially turned. By moving the lever forward again, the entire circle of the can may be traversed, but it will be understood that ordinarily it is not desired to sever the top of the can more than part of the way round.

The cutter may be removed and renewed as often as may be desired, it being merely necessary to temporarily remove the pin 14 for this purpose, and it will be understood that the form and shape of the cutter may be varied at will to best suit the requirements of the work.

What we claim is:

1. A can opener comprising two semi-annular gripper members pivoted together and provided with handles by which they may be manipulated, the said members being provided exteriorly with a flange throughout a portion of their circumference only, and a cutter carrying lever pivotally connected to one of said members at a point substantially central therewith, the said lever being provided with a portion adapted to engage and be guided by the said flange.

2. In a can opener, the combination with two semi-annular gripper members pivoted together and provided with handles by which they may be manipulated, the said members having a plurality of concentric gripping faces and provided exteriorly with a flange throughout a portion of their circumference only, a central post rotatively mounted in one of the said gripping members and a cutter carrying lever pivotally mounted upon said central post, the said lever being provided with a portion adapted to engage and be guided by the said flange.

WILLIAM H. WINFIELD.
WILLIAM SENN.

Witnesses:
D. HOWARD HAYWOOD,
LYMAN S. ANDREWS, Jr.